United States Patent [19]

Patil et al.

[11] 4,348,240

[45] Sep. 7, 1982

[54] PROCESS FOR DEACTIVATING SOLUBLE METAL CATIONS IN IRON OXIDE PIGMENTS

[75] Inventors: Arvind S. Patil, Wyoming, Mich.; Siegfried P. Kersten, Frankenthal, Fed. Rep. of Germany; Werner P. Fliege, Grosse Ile, Mich.

[73] Assignee: BASF Wyandotte Corporation, Wyandotte, Mich.

[21] Appl. No.: 218,863

[22] Filed: Dec. 22, 1980

[51] Int. Cl.$^3$ ............... C04B 31/02; C09C 1/24
[52] U.S. Cl. ................................. 106/304; 106/309
[58] Field of Search ............ 106/304, 309; 423/632, 423/633

[56] References Cited

U.S. PATENT DOCUMENTS 4,167,582  9/1979  Takahashi et al. ............... 428/328
4,289,746  9/1981  Hayakawa et al. ............ 106/304 X Primary Examiner—Carl F. Dees
Attorney, Agent, or Firm—David L. Hedden; Joseph D. Michaels

[57] ABSTRACT

The subject matter of this invention relates to a process for deactivating the soluble metal cations contained in iron oxide pigments comprising:

A. adding, while oxidizing, an alkalizing compound to an iron oxide pigment, a slurry until the pH of the pigment slurry is greater than 9; and B. separating the iron oxide pigment from the liquid phase of the slurry.

The pigments can be used as colorants for substances ingested by man and animals, and they can also be used to stabilize plastics against ultraviolet degradation.

8 Claims, No Drawings

PROCESS FOR DEACTIVATING SOLUBLE METAL CATIONS IN IRON OXIDE PIGMENTS

BACKGROUND OF THE INVENTION

1. Field of the Invention

The subject matter of this invention relates to a process for deactivating the soluble metal cations found in opaque or transparent iron oxide pigments. The resulting pigments can be used as colorants in substances which are ingested by human beings and animals, and they can also be used to stabilize plastics against ultraviolet degradation.

2. Description of the Prior Art

Iron oxide pigments are found in nature as mineral deposits. There are three types of iron oxide pigments which are found in nature as mineral deposits. These are limonite, hematite, and magnetite. Limonite is yellow and has a chemical formula of $Fe_2O_3.xH_2O$ where x is an integer. As can be seen from its formula, it is a hydrated iron (III) oxide. Hematite is red and has a chemical formula of $Fe_2O_3$. It is an anhydrous iron (III) oxide. Magnetite is black and has a chemical formula of $Fe_3O_4$. It is considered to be a spinel containing iron (II) and iron (III) ions.

In addition to the natural mineral deposits, iron oxide pigments can be obtained synthetically. Synthetic methods for preparing iron oxide pigments generally involve the alkali precipitation of iron (II) compounds from a soluble iron (II) salt and the oxidation of the precipitated iron (II) compound to an iron (III) oxide pigment slurry. The pigment produced by such methods corresponds to the yellow hydrated iron (III) oxide previously described. The yellow pigment is recovered from the slurry by filtration, washing, and drying. The alkali precipitation must occur under acidic conditions; otherwise, dark brown or black undesirable color shades will be produced. Iron oxide pigments of various yellow shades can be prepared by controlling the temperature and rate of oxidation. Red, black and other colors can be prepared by calcining the yellow pigments at high temperatures.

Iron oxide pigments which have an average particle size less than 0.1 micron are considered to be transparent because they can transmit visible light. Iron oxide pigments which have an average particle size greater than 0.1 micron and which cannot transmit visible light are considered to be opaque. Generally, naturally occurring iron oxide pigments are opaque.

Whether the iron oxide pigments are mined or manufactured, transparent or opaque, they have high concentrations of soluble metal cations such as antimony, arsenic, barium, beryllium, cadmium, chromium, cobalt, copper, lead, manganese, mercury, nickel, selenium, thorium, tin, and zinc. The presence of soluble metal cations greatly restricts the use of iron oxide pigments. They cannot be used as colorants in substances ingested by man and animals, such as food and medicine, because the soluble metal cations will catalyze oxidative reactions which will cause the substances to spoil. The soluble metal cations will also cause plastics to degrade. Consequently, iron oxide pigments, which act as stabilizers against ultraviolet radiation of wavelengths between 300 nanometers and 400 nanometers, cannot be used for this purpose.

Accordingly, there is a need to develop a method to deactivate or remove the metal cations present in iron oxide pigments in order to expand the application of these pigments. This is particularly so since the iron oxide pigments are suspected of being nontoxic and noncarcinogenic, and could be substituted for many of the organic pigments and dyes which are believed to be toxic and/or carcinogenic.

SUMMARY OF THE INVENTION

Applicants have discovered a process for deactivating soluble metal cations contained in iron oxide pigments comprising:

A. adding, while oxidizing, an alkalizing compound to an iron oxide pigment slurry until the pH of the pigment slurry is greater than 9; and B. separating the iron oxide pigment from the liquid phase of the slurry.

This process can be used to deactivate the soluble metal cations in transparent or opaque iron oxide pigments which are naturally occurring or synthetically manufactured without destroying the coloring properties of the pigments. The pigments which have been subjected to this process can be used to color substances ingested by human beings and animals such as food, medicine, vitamins, minerals, and chemicals. Because the soluble metal cations in the iron oxide pigment have been deactivated, the substances will not oxidize and spoil. They can also be used in plastics to stabilize them against ultra-violet degradation. Furthermore, they are believed to be noncarcinogenic and nontoxic. Because organic colorants, which are widely used to color the foregoing substances, may be carcinogenic or toxic, iron oxide pigments can be used as substitutes for them.

DESCRIPTION OF THE PREFERRED EMBODIMENT

Iron oxide pigment obtained by mining naturally occurring iron oxide or by manufacturing iron oxide pigment in accordance with known processes such as those described in U.S. Pat. Nos. 1,327,061 and 2,558,302, which are hereby incorporated into this application by reference, may be used in the process of this invention. Typically, iron oxide pigments are prepared by alkali precipitation of iron (II) compounds from solutions of water soluble iron (II) salts, and oxidation of the precipitated iron (II) compounds to an iron (III) oxide pigment slurry. The pigment is recovered from the slurry by filtration, washing, and drying. The pH of the system must be maintained in an acidic range during the alkali precipitation and oxidation of the precipitated iron (II) compounds in order to prevent undesirable black or dark brown color shades from being formed. Those of ordinary skill in the art are familiar with these problems and techniques. Various color shades of iron oxide pigment can be produced by calcining the iron (III) oxide at high temperatures.

In order to deactivate the soluble metal metal cations contained in the iron oxide pigment, an alkalizing compound is added to an iron oxide pigment slurry. An iron oxide pigment slurry is a mixture of iron oxide pigment and a liquid. If dried iron oxide pigment is used, a slurry can be made by adding water or other liquids to the iron oxide pigment. If the iron oxide pigment is prepared in accordance with any of the processes described in the prior art, the alkalizing compound is preferably added while the iron (II) oxide pigment is still in a slurry state, before washing, filtering, and drying. As was previously mentioned, the preparation of iron oxide pigment according to the processes disclosed in the prior art is carried out under acidic conditions; otherwise, black or dark brown color shades of pigment are produced. It has been discovered, however, that a second alkali precipitation can be performed after oxidation of the iron (II) compound to the iron (III) oxide. This second alkali precipitation will deactivate the metal cations which remain in the pigment, but it will not cause black or brown color shades to be produced even though the pH of the system may eventually exceed 9.

Representative examples of alkalizing compounds which can be used to add to the iron oxide pigment slurry include bases such as sodium hydroxide, potassium hydroxide, sodium carbonate, potassium carbonate, sodium bicarbonate, and potassium bicarbonate. These compounds are preferably dissolved in solvents such as water to form solutions. The concentration of the alkalizing compound in the solution is preferably 10 percent to 95 percent by weight relative to the liquid solvent.

While the alkalizing compound is being added to the pigment slurry, the slurry is oxidized. Oxidation can be performed in any suitable manner. One method is by aeration which involves spraying the pigment slurry from a perforated pipe into the air. Another method is by bubbling air or a mixture of oxygen and an inert gas through the pigment slurry. If this method is used, it may be preferable to agitate, shake, or stir the pigment slurry while the air or mixture of oxygen and inert gas is bubbled into the slurry. Another method of oxidizing is by using a chemical oxidizing agent such as hydrogen peroxide or other chemical oxidants which will provide oxygen but will not (as potassium permaganate or sodium dichromate would) impart any color to the solution. It is not practical to effectuate the oxidation by allowing the slurry to stand while exposed to the air or atmospheric oxygen.

The alkalizing compound is added gradually until the pH of the solution is greater than 9. Preferably, however it is added until the pH of the solution is greater than 12. The rate at which it is added will depend upon the concentration of the alkalizing compound and the quantity of the pigment slurry to be neutralized. If the concentration of the alkalizing compound increases, the rate of addition should decrease. If the quantity of the slurry to be neutralized increases, the rate of addition can be increased. In general, it may be said that the alkalizing compound is added at the rate of 5 milliliters to 10 milliliters per minute per 100 gallons of slurry. After the pigment slurry reaches the desired pH, the iron oxide pigment is recovered by filtration or other means. The pigment can then be dried and milled. It may also be calcined at high temperatures to produce different color variations.

As was previously mentioned, the pigments can be used to color substances ingested by man and animals such as foods, medicines, vitamins, minerals, carbohydrates, fats, proteins, and chemicals. The pigments are mixed with these substances during processing. The amount of pigment added will depend upon the shade and brilliancy of the color wanted.

The pigments can also be added to thermoplastic or thermosetting polymers to stabilize the polymer against ultraviolet radiation. Examples of thermoplastic polymers which can be stabilized against ultraviolet degradation by adding iron oxide pigments prepared in accordance with this invention are polysulfones, polyesters, polyurethanes, polystyrene, cellulose esters, acrylics, polyamides, and polyolefins. Examples of thermoset polymers which can be stabilized against ultraviolet degradation by adding iron oxide pigments prepared in accordance with this invention are acrylic, alkyd, and urethane polymers. Only small amounts, from 0.005 to 0.05 percent by weight of the plastic, are needed for this purpose. They can be added for this purpose in combination with other colorants.

The examples which follow provide details which will enable those of ordinary skill in the art to practice this invention. All parts are by weight unless otherwise indicated.

EXAMPLE 1

A 200 gallon tank of iron oxide pigment slurry produced by alkali precipitation and oxidation was agitated with air while a ten percent NaOH solution was added at the rate of 5 milliliters to 10 milliliters per minute. The pH was monitored occasionally until a pH of 12.3 was reached. The pigment was then filtered, washed, dried and milled. The color of the pigment was yellow. Part of the yellow pigment was calcined and milled to produce red pigment. A slurry of the pigment and deionized water was analyzed by atomic absorption spectroscopy. The level of soluble metal cations present was less than 1 ppm.

EXAMPLE 2

Iron oxide pigment prepared in accordance with Example 1 was added to Vitamin A and Vitamin A esters in amounts equal to approximately 10 percent iron oxide. The samples were stored at 0° C. and no decomposition was detected over a period of five months.

EXAMPLE 3

A five percent dispersion of yellow pigment prepared in accordance with Example 1 was made in peanut oil. A similar dispersion of untreated control pigment was also prepared. The samples were allowed to stand for five days at room temperature. The oil containing the control became rancid at the end of five days, but the dispersion of the pigment produced in accordance with Example 1 did not become rancid.

EXAMPLE 4

Yellow iron oxide of Example 1 was used to stabilize unsaturated polyester against ultraviolet radiation. A master batch with thirty-eight percent pigment was made. Significantly, there was no change in the cure time during the reaction of phthalic acid, propylene glycol, and styrene, which would have normally been shortened, had there been any catalytic reactions with ionic salts. Further samples of pigmented unsaturated polyester were prepared at pigment concentrations of 0.08, 0.015 and 0.1 percent. These were subjected to ultraviolet radiation in a Xenotest apparatus for up to 1000 hours along with an unpigmented control. If the unsaturated polyester is undergoing degradation, yellowing of the resin occurs. This yellowing can be measured and is expressed as Yellowness Index. It is the change in the Yellowness Index that is indicative of the degradation. The data in the table which follows indicate the absence of catalytic degradation since no appreciable increase in the Yellowness Index was detected in the samples containing iron oxide pigment prepared in accordance with Example 1.

TABLE 1

| Yellowness Index After Xenotest Exposures | | | |
|---|---|---|---|
| | 0 Hrs. | 500 Hrs. | 1000 Hrs. |
| Control | 2.79 | 3.89 | 4.26 |
| 0.008% TIO Yellow | 9.74 | 10.57 | 10.66 |
| 0.015% TIO Yellow | 15.7 | 16.34 | 16.50 |
| 0.1% TIO Yellow | 59.7 | 60.31 | 59.98 |

The embodiments of this invention in which an exclusive privilege or property is claimed are defined as follows:

1. A process for deactivating soluble metal cations contained in synthetic iron oxide pigments having a yellow shade which are prepared under acidic conditions comprising
   A. adding, while oxidizing, an alkalizing compound to iron oxide pigment slurry until the pH of the pigment slurry is greater than 9; and
   B. separating the iron oxide pigment from the liquid phase of the slurry.

2. The process of claim 1 wherein the alkalizing compound is sodium hydroxide.

3. The process of claim 2 wherein the alkalizing compound is diluted with water such that the weight concentration of the alkalizing compound is from 10 percent to 20 percent.

4. The process of claim 3 wherein the oxidation is accomplished by aeration.

5. The process of claim 4 wherein the sodium hydroxide is added at the rate of 5 milliliters to 10 milliliters per minute per 100 gallons of slurry.

6. In a process for preparing synthetic pigments having a yellow shade which are prepared under acidic conditions comprising the alkali precipitation of iron (II) compounds from a solution of soluble iron (II) salt and oxidation of the precipitated iron (II) compound to an iron (III) oxide, the improvement which comprises
   A. adding, while oxidizing, an alkalizing compound to iron oxide pigment slurry until the pH of the pigment slurry is greater than 9; and
   B. separating the iron oxide pigment from the liquid phase of the slurry.

7. An iron oxide pigment devoid of active soluble metal cations prepared in accordance with the process of claim 1.

8. The process of claim 1 or 6 wherein the alkalizing compound is added to the iron oxide pigment slurry until the pH of the pigment slurry is greater than 12.

* * * * *